Oct. 8, 1940.    W. SHEPHERD ET AL    2,217,498
TIRE CHAIN
Filed June 19, 1939
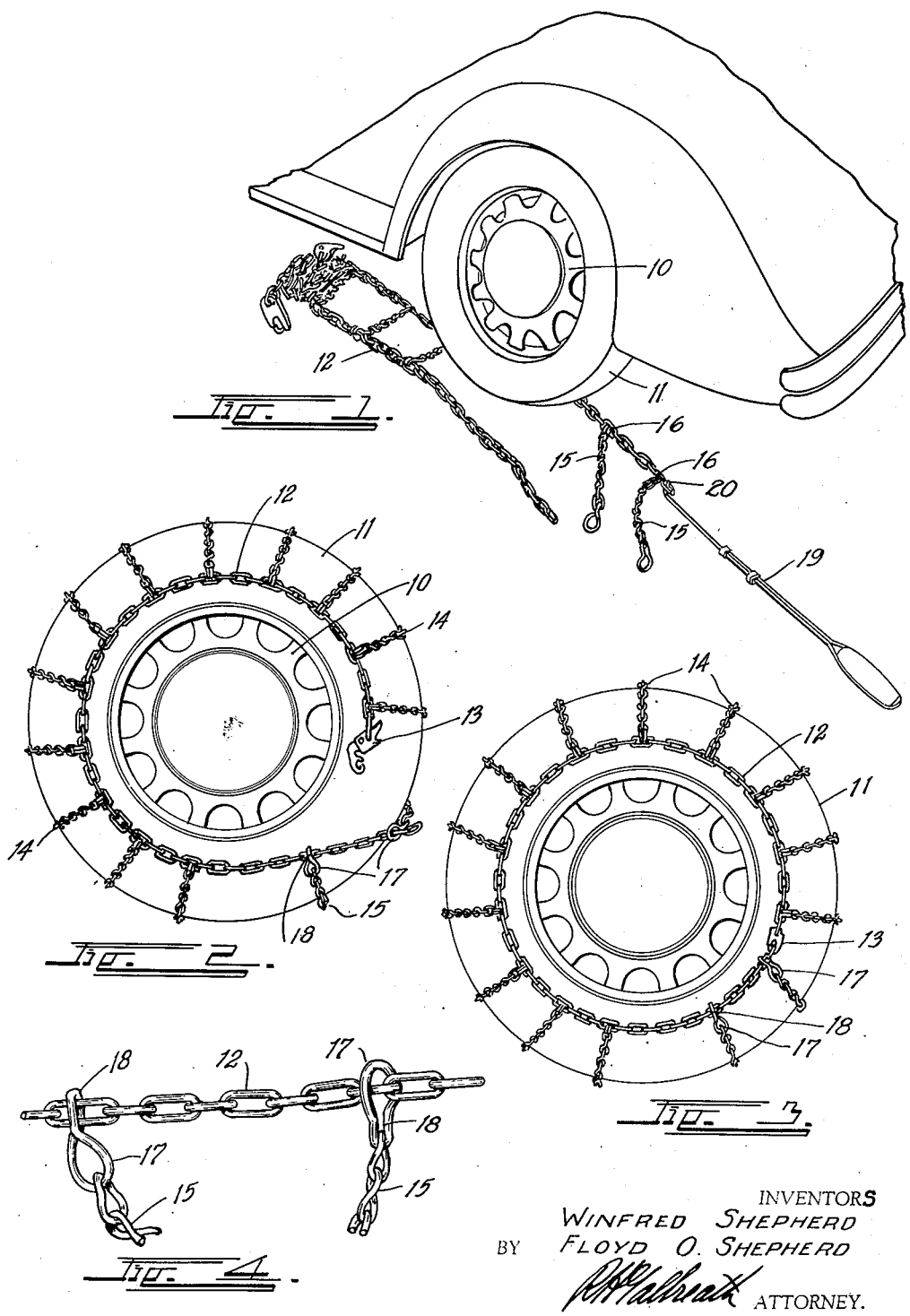
INVENTORS
WINFRED SHEPHERD
FLOYD O. SHEPHERD
BY
ATTORNEY.

Patented Oct. 8, 1940

2,217,498

UNITED STATES PATENT OFFICE 2,217,498

TIRE CHAIN

Winfred Shepherd and Floyd O. Shepherd, Elizabeth, Colo.

Application June 19, 1939, Serial No. 279,856

1 Claim. (Cl. 152—241)

This invention relates to a tire chain for automotive vehicles.

It is exceedingly difficult, if not impossible, to apply the usual tire chair to the tire when the car is mired down in mud or snow. The principal object of this invention is to provide a tire chain construction which will enable the user to apply the chains to the tires without any necessity for "jacking" up the wheels or driving the car forward or backward onto the chains; and to provide a chain which can be applied to the wheels even though the latter may be sunken in mud or snow.

Another object of the invention is to provide a tool which will enable the user to place the chains in position without soiling the hands or clothing.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a perspective view illustrating the improved chain being applied to the left rear wheel of an automobile.

Figs. 2 and 3 are side views of an automobile wheel illustrating successive steps in the application of the improved chain.

Fig. 4 is a detail view illustrating the particular type of attachment link employed in this invention.

In the drawing, an automobile wheel is illustrated at 10 with the tire thereon at 11.

The improved tire chain employs two side chains 12 each terminating at one extremity in an attachment device 13, for engagement in the links at the other extremity thereof, similar to the usual tire chain.

A series of fixed cross or tread chains 14 are secured to, and extend between, the two side chains 12. The cross chains 14 are not placed throughout the entire length of the side chains 12 so that the latter chains terminate in free unattached extremities.

A plurality of loose cross chains 15 (two being shown) are permanently secured to the inner one of the two side chains 12, as shown at 16, Fig. 1. At their free extremities, the loose chains 15 terminate in twisted attachment links 17. One side of the attachment link 17 is open and rounded so that it may pass freely over the other side chain 12. The other extremity thereof is flattened to form an elongated slot 18 into which one of the links of the side chain can be passed edgewise to prevent longitudinal movement of the attachment link along the side chain.

Let us assume that it is desired to apply the chain to the tire 11 without moving the car or lifting the wheel. The chain is placed on the ground ahead of the wheel. The free extremities of the two side chains are then drawn rearwardly at each side of the wheel, as shown in Fig. 1.

To assist in drawing the inner side chain rearwardly, especially on the modern cars having low fenders, a collapsible, handled, hooked tool 19 is provided having a hooked extremity 20 for engaging the links of the inner side chain. The chain can, of course, be applied without this tool but it is of great assistance in drawing the inner chains rearwardly without inconvenience.

The side chains are drawn rearwardly until the first fixed cross chain 16 is drawn as far as possible between the wheel and the ground. The remainder of the chain is then elevated and spread over the tire as shown in Fig. 2.

The open side of the attachment link 17 of the first loose chain 15 is then passed over the free extremity of the outer side chain 12 and is pushed forwardly on this chain as far as possible to wedge the first loose cross chain between the tire and the ground. When the attachment link has reached its furthest possible position, it is reversed to engage the outer side chain 12 with its narrowed slotted extremity 18 which fixedly locks the loose cross chain on the outer side chain.

The next loose cross chain is now similarly placed in position, properly spaced from the first loose chain, and the free extremities of the side chains are attached to the attachment devices 13. The chain is now in permanent position and can be used, as applied, until no longer desired.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

A tire chain comprising side chains formed of flat interengaging links, a series of cross chains extending between the side chains and permanently secured at their ends to both of the side chains, said cross chains being spaced from each other longitudinally of the side chains, other cross chains spaced from each other longitudinally of the side chains between the series of permanently secured cross chains and one end of the tire chain, each of the last mentioned cross chains having at one end an attaching link loosely engaged with a link of the side chain for turning adjustment to present a selected end portion thereof outwardly, the attaching link being for the major portion of its length of a width adapting it to be engaged about and slid along a side chain and for the remainder of its length being crimped to provide a narrow end portion for fitting snugly about a selected link of the side chain when presented outwardly and detachably securing the cross chain in a set position between the side chains.

WINFRED SHEPHERD.
FLOYD O. SHEPHERD.